UNITED STATES PATENT OFFICE.

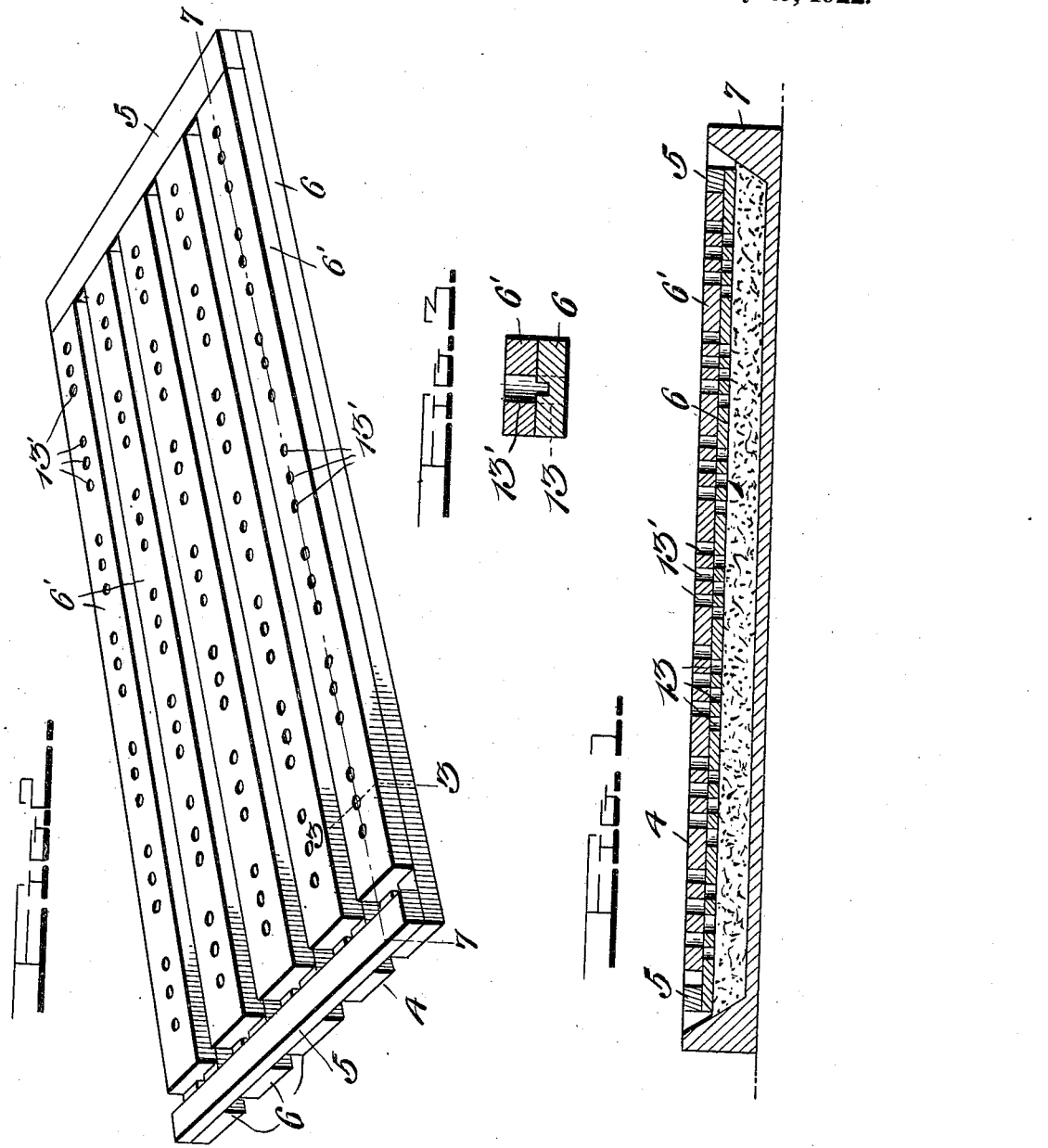

JOSEPH BYRON WHITE, DECEASED, LATE OF CLARION, IOWA, BY IDA E. WHITE, ADMINISTRATRIX, OF CLARION, IOWA.

SEED AND GROUND TESTER.

1,423,979.  Specification of Letters Patent.  Patented July 25, 1922.

Application filed July 3, 1920. Serial No. 393,947.

*To all whom it may concern:*

Be it known that JOSEPH BYRON WHITE, deceased, a former citizen of the United States, formerly residing at Clarion, in the county of Wright and State of Iowa, has invented certain new and useful Improvements in Seed and Ground Testers, of which the following is a specification, reference being had to the accompanying drawings.

This invention relates to seed testers, and apparatus for testing the fertility of ground, and more particularly to apparatus of this kind by which the comparative germinating powers of different samples of corn can be ascertained.

Another object of the invention is to provide a device of this general character embodying a novel and improved recording frame which is employed to facilitate the requisite planting of the seeds to be tested.

In the drawings which illustrate by way of example, an embodiment of this invention;

Figure 1 is a longitudinal sectional view taken through a tester constructed in accordance with an embodiment of my invention, the line of section being taken through the recording frame on substantially the line 7—7 of Figure 2.

Figure 2 represents a view in perspective of a recording frame, embodying this invention;

Figure 3 is a fragmentary sectional view taken substantially on the line 3—3 of Figure 2.

As disclosed in the accompanying drawings, 4 denotes the recording frame which consists of five cross-pieces 6 which are suitably secured to two end pieces 5. Each one of these cross pieces is drilled for a series of seven sets of three holes, each set being separated a suitable distance from the neighboring ones so that the seeds in growing can be easily distinguished by sets. This recording frame is set upon or in an earth trough 7 which consists of a box having an open top and partly filled with earth. When the recording frame is put inside of this trough it preferably comes flush with the top part thereof. The recording frame serves as a means for giving a different location to the sets, and can be readily removed from each trough after the earth of the same has been suitably punched for the seeds.

Slidably disposed on the cross pieces 6 are a number of subcross pieces 6' that are suitably provided with holes 13' which come into register with the holes 13 when these bars are moved towards the right, as is clearly shown in the drawings. Under ordinary conditions the seeds are disposed within said holes, 13' so that when the last mentioned pieces are moved over so that their holes register with the holes in the cross pieces beneath them, the seeds will drop therein and by means of the planter key be pushed a suitable distance in the earth of the trough.

The preferable plan of operation is as follows: A kernel removed from an ear of corn, near the top portion thereof. This kernel being placed in the first hole of the corresponding set in the trough. Another kernel is taken from the central portion of the ear and placed in the second hole of the corresponding hole, and a third kernel from the lower portion of the ear is removed and put in the third and last hole of the corresponding set. In the same way, other seeds are taken from the remaining ears and suitably located within the troughs.

When the seeds are taken to the recording frame, which is placed over a trough 7, they are placed within the holes 13' disposed in the upper slat 6' until the whole row is filled with them. Then the slot is moved towards the left so that the holes 13' within the same will correspond with the holes 13 in the lower cross piece 6. When the seeds or kernels have fallen within the lower cross piece and are disposed on the earth in which they are to be placed, the planter key is taken and each seed is pushed the desired distance into the earth. This operation is repeated for each row, until the whole trough has seeds suitably disposed therein. The recording frame is then removed.

This affords a means whereby the seeds can be readily tested, and quickly indicates the value of an ear of corn, and which part of the ear is most suitable for the conditions arising.

After the seeds have been properly planted within the trough 7, a screen frame or wire mesh cover 8 is placed thereover, said frame or cover being preferably painted in seven different stripes so that each stripe will cover the sets of holes in the corresponding cross piece. This frame or cover 8 serves as a mouse proof covering and remains on the trough 7 until the corn has grown through it and is of suitable strength to prevent and possibility of mice destroying the seeds, before it is removed.

Having thus described the invention it is claimed:

1. A recording frame for use in testing seeds comprising an elongated strip provided at spaced points therealong with a plurality of series of openings, a second strip slidably mounted on the first named strip, said second strip being also provided with a plurality of series of openings, the series of openings of the second strip registering with the series of openings of the first strip when the second strip is moved in one direction.

2. A recording frame for use in testing seeds comprising an elongated strip provided at spaced points therealong with a plurality of series of openings, a second strip slidably mounted on the first named strip, said second strip being also provided with a plurality of series of openings, the series of openings of the second strip registering with the series of openings of the first strip when the second strip is moved in one direction, said second strip closing the openings of the first strip when said second strip is moved in the opposite direction.

3. A recording frame for use in testing seeds comprising an elongated strip provided at spaced points therealong with a plurality of series of openings, a second strip slidably mounted on the first named strip, said second strip being also provided with a plurality of series of openings, the series of openings of the second strip registering with the series of openings of the first strip when the second strip is moved in one direction, said second strip closing the openings of the first strip when said second strip is moved in the opposite direction, said first named strip being provided with means coacting with the second strip for limiting the movement of the second strip in either direction.

In testimony whereof, I affix my signature in the presence of two witnesses.

IDA E. WHITE.
*Administratrix of Joseph Byron White, deceased.*

Witnesses:
    R. S. AUSTIN,
    JESSIE AUSTIN.